United States Patent
Woeste et al.

Patent Number: 5,617,760
Date of Patent: Apr. 8, 1997

[54] SHIFT LEVER FOR A MOTOR VEHICLE TRANSMISSION

[75] Inventors: Norbert Woeste, Munich; Josef Neuner, Raubling, both of Germany

[73] Assignee: Bayerische Motoren Werke Aktiengesellschaft, Germany

[21] Appl. No.: 488,912

[22] Filed: Jun. 9, 1995

[30] Foreign Application Priority Data

Aug. 4, 1994 [DE] Germany ............... 44 27 695.8

[51] Int. Cl.$^6$ ............... F16H 63/38; F16D 57/00
[52] U.S. Cl. ............... 74/475; 74/538; 188/290
[58] Field of Search ............... 74/475, 538; 188/290

[56] References Cited

U.S. PATENT DOCUMENTS

| | | | |
|---|---|---|---|
| 4,426,752 | 1/1984 | Nakayama | 188/290 X |
| 4,774,850 | 10/1988 | Shovlin | 74/538 X |
| 5,277,282 | 1/1994 | Umemura | 188/290 |

FOREIGN PATENT DOCUMENTS

| | | |
|---|---|---|
| 2530784 | 1/1977 | Germany . |
| 8707936.4 | 9/1987 | Germany . |
| 4016977C2 | 11/1991 | Germany . |
| 4209930A1 | 9/1993 | Germany . |
| 4217500A1 | 12/1993 | Germany . |
| 4337377A1 | 6/1994 | Germany . |
| 4342460A1 | 6/1994 | Germany . |

OTHER PUBLICATIONS

EP 95108113.2 European Search Report Nov. 7, 1995.
Krause, Werner: Konstruktionselemente der Feinmechanik, Carl Hanser Verlag Muenchen Wien, 1989, pp. 478–486.
German Search Report P4427695.8 Mar. 8, 1995.

*Primary Examiner*—Allan D. Herrmann
*Attorney, Agent, or Firm*—Evenson, McKeown, Edwards & Lenahan P.L.L.C.

[57] ABSTRACT

This invention relates to a selector lever for a motor vehicle transmission, in the case of which, by way of a push button, a detent element can be moved so that the selector lever can be adjusted into different positions. In order to allow a restoring of the detent element to take place with as little noise as possible, the restoring movement is damped according to the invention. In a suitable manner, a visco-damper is used for this purpose.

18 Claims, 1 Drawing Sheet

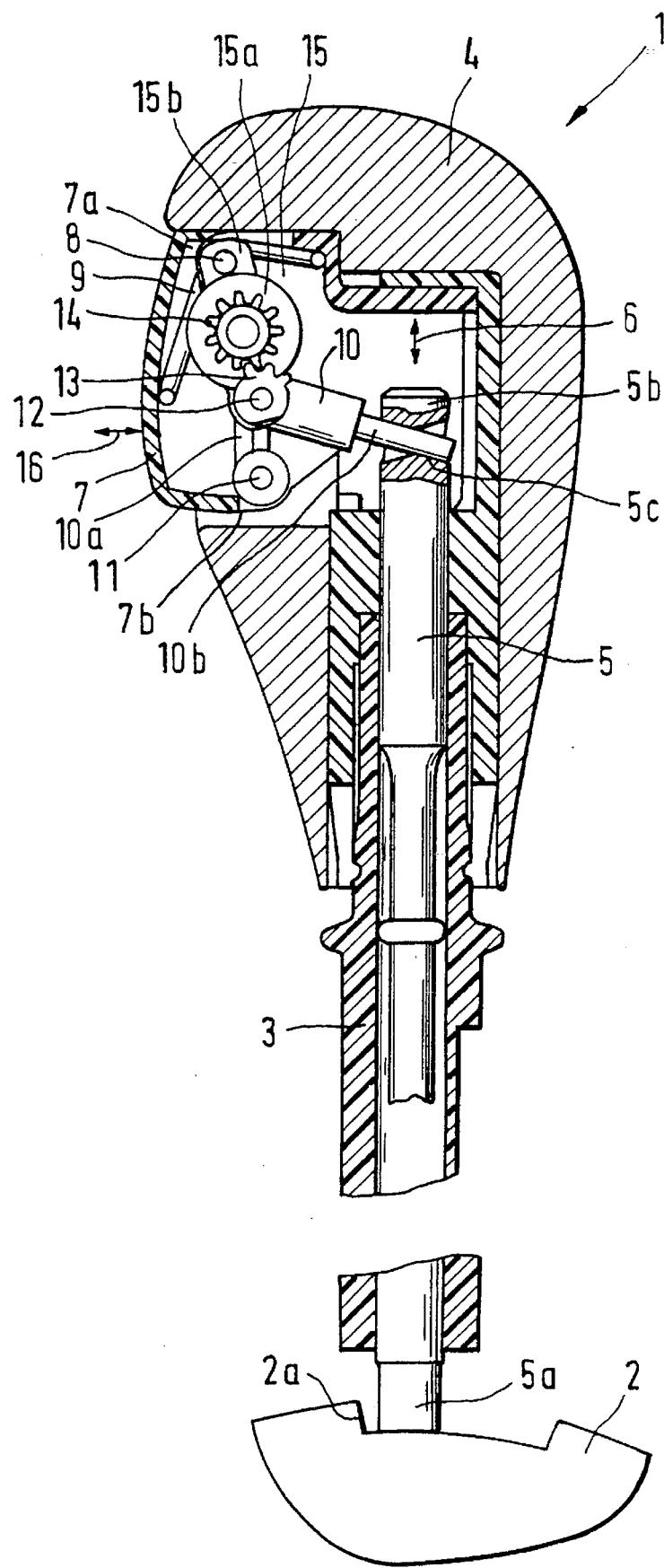

SHIFT LEVER FOR A MOTOR VEHICLE TRANSMISSION

BACKGROUND AND SUMMARY OF THE INVENTION

This invention relates to a selector lever for a motor vehicle transmission including a shift handle and an actuable detent element which automatically moves back into the starting position after being actuated.

In the case of many selector levers for motor vehicle transmissions, particularly automatic transmissions, safety devices are installed in order to prevent an unintentional shifting into certain driving positions. Such safety devices may be represented by a shifting gate comprising shifting gate positions. A detent element, as a rule a detent rod guided in the shift lever rod, engages in these shifting gate positions. In this manner, the detent rod locks the selector lever and prevents that a change into another driving position can take place. By way of an actuating element on the handle of the selector lever, the detent rod can be moved out of the shifting gate positions and will then release the selector lever.

After the push button is released, the restoring spring presses the detent rod back into the starting position. In this case, the detent rod strikes upon the shifting gate with a clearly discernible sound. In many cases, such a sound is considered to be disturbing.

It is an object of the invention to prevent such a sound or reduce it to a bearable degree in the case of a selector lever for a motor vehicle transmission.

According to the invention, this object is achieved by means of providing damping for the detent element. According to the invention, the restoring movement of the detent element is therefore damped. As a result, it impacts on the shifting gate at a reduced speed, causing a diminished sound or almost no sound. The more the restoring path is damped, the lower the impact noise.

In a preferred embodiment, the invention is used in the case of a selector lever comprising a selector lever rod and a shift handle fastened to it. A push button is swivellably disposed on the shift handle and, by way of an angle lever, acts upon a detent rod guided in the selector lever rod. A damping device engages on the angle lever. In this case, a so-called visco-damper can be used as the damping element which is known per se and which is used in many different fields. Such a visco-damper consists of a housing which is filled with a tough and therefore highly viscous liquid. An impeller rotates in the liquid against its resistance which will finally result in a damping of the rotating movement of the impeller.

It is within the scope of the invention to provide that the damping device is also applied at a point different from the angle lever. Thus, by means of a corresponding damping device, it is, for example, contemplated to directly dampen the displaceability of the detent rod. It is also contemplated to act upon the swivel movement of the push button by means of a suitable damping device. It is a primary object of the invention to dampen the detent elements in their restoring movement whatever their design or actuation.

Other objects, advantages and novel features of the present invention will become apparent from the following detailed description of the invention when considered in conjunction with the accompanying drawings.

BRIEF DESCRIPTION OF THE DRAWINGS

The single drawing FIGURE is a sectional view through a selector lever for a motor vehicle transmission, constructed according to a preferred embodiment of the invention.

DETAILED DESCRIPTION OF THE DRAWINGS

A selector lever 1 can be moved along an outlined shifting gate 2 which is fixedly connected with a vehicle body. In this fashion, the individual driving positions of the automatic transmission can be selected in a known manner. In addition, the selector lever 1 has a hollow selector lever rod 3 on whose side facing the shifting gate 2, a shift handle 4 is fastened. In addition, a detent rod 5 is displaceably held in the selector lever rod 3, which detent rod 5 engages by means of a lower end section 5a in a shifting gate position 2a of the shifting gate 2. The upper end of the detent rod 5 projects into a hollow space of the shift handle 4. An actuating mechanism is housed in this hollow space by means of which the detent rod can be moved. The mobility of the detent rod is indicated by a double arrow 6.

The actuating mechanism first comprises a push button 7 which, by means of an upper end section 7a, is rotatably disposed on the shift handle. A bearing for the push button is not indicated in the drawing but the assigned axis of rotation has the reference number 8. A restoring spring 9 which, on the one hand, is supported on the shift handle 4 and, on the other hand, on the push button 7, presses the push button 7 out of the shift handle 4. A stop, which is not indicated in detail, limits this movement. The swivellability of the push button is indicated by a double arrow 16.

An angle lever 10 is rotatably disposed by means of its one lever arm 10a on the lower end section 7b of the push button 7. A bearing for the angle lever is not clearly outlined but is symbolized by an axis of rotation 11. By means of a pin, the other lever arm 10b of the angle lever 10 engages in a passage bore 5c of the upper end 5b of the detent rod 5. In a center section—which is only outlined—the angle lever 10 is rotatably disposed on the shift handle 4. The axis of rotation has the reference number 12.

Concentrically with respect to the axis of rotation 12, the angle lever 10 has a tooth segment 13 in the center area which has several upward-pointing teeth. The tooth segment 13 is fixedly connected with the angle lever 10. These teeth mesh in a gear wheel 14 which is part of a visco-damper 15. The visco-damper 15 comprises a housing 15a which is fixed on the shift handle 4 by means of fastening lugs. The drawing shows only one fastening lug 15b which is situated in the area of the axis of rotation 8. An opposite fastening lug is situated in the area of the axis of rotation 12, thus of the bearing of the angle lever 10 on the shift handle 4. An impeller, which is not visible, rotates in the housing 15 in a viscous liquid. The impeller and the gear wheel 14 are connected with one another by means of a common shaft.

The method of operation of the selector lever 1 is as follows. If the driver wants to move the selector lever 1 beyond the shifting gate position 2a, he presses on the push button 7. By means of the articulated connection on the push button 7 and its rotationally movable bearing in the shift handle 4, the angle lever 10 swivels upward by means of its lever arm 10b and takes along the detent rod 5. Simultaneously, the tooth segment 13 rotates counterclockwise and rotates the gear wheel 14. However, this is not very important in the case of this moving direction because the force which the driver applies for pushing down the push button is much higher than the resistance which the impeller must overcome when it rotates in the viscous liquid.

The end 5a of the detent rod 5 is pulled into the shift lever rod 3. The driver can now move the shift lever either to the left or to the right, depending on which driving position he wants to engage. After he has selected this driving position, he will release the push button 7. The restoring spring 9 will press it toward the outside. In this case, it takes along the angle lever 10 whose tooth segment will now rotate clockwise and correspondingly take along the gear wheel 14. This gear wheel 14, in turn, rotates against the resistance of the visous liquid in the visco-damper. By coordinating the spring force of the restoring spring 9 with the resistance which the visous liquid exercises on the impeller or the gear wheel 14, the restoring movement of the detent rod 5 can be damped to the desired extent. Correspondingly, by means of its end section 5a, the detent rod 5 impacts with a decelerated speed on the selected shifting gate. The impact noise is correspondingly reduced and, in the case of a corresponding adjustment, can be almost prevented.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A selector lever for a motor vehicle transmission, comprising:

a hollow selector lever rod;

a detent rod arranged in said hollow selector lever rod and displaceable between a starting position and a shifting position;

a shift handle disposed on the selector lever rod;

an actuating mechanism comprising a push button, a restoring spring, and a lever, said push button being connected to the shift handle and being movable between a push button starting position and a push button shifting position, said restoring spring biasing the push button toward said push button starting position, said lever pivotably disposed on said shift handle, said lever having a first end and a second end, said lever being operatively connected with said push button proximate said first end and said lever being operatively connected with said detent rod proximate said second end; and a damping element operatively connected with said actuating mechanism, said damping element decelerating a movement of said detent rod from said shifting position toward said starting position.

2. A selector lever according to claim 1, wherein said lever comprises a first arm and a second arm, said first arm being operatively connected with said push button, and said second arm being operatively connected with said detent rod.

3. A selector lever according to claim 1, wherein said push button comprises a first end section which is swivellably connected to said shift handle and a second end section opposite the first end section which is hingedly connected with said lever.

4. A selector lever according to claim 2, wherein said push button comprises a first end section which is swivellably connected to said shift handle and a second end section opposite the first end section which is hingedly connected with said lever.

5. A selector lever according to claim 1, further comprising a tooth segment fixed on said lever, and wherein said damping element comprises a visco-damper which is fixed on the shift handle, said visco-damper including a gear wheel which is arranged to mesh with said tooth segment.

6. A selector lever according to claim 2, further comprising a tooth segment fixed on said lever, and wherein said damping element comprises a visco-damper which is fixed on the shift handle, said visco-damper including a gear wheel which is arranged to mesh with said tooth segment.

7. A selector lever according to claim 3, further comprising a tooth segment fixed on said lever, and wherein said damping element comprises a visco-damper which is fixed on the shift handle, said visco-damper including a gear wheel which is arranged to mesh with said tooth segment.

8. A selector lever according to claim 4, further comprising a tooth segment fixed on said lever, and wherein said damping element comprises a visco-damper which is fixed on the shift handle, said visco-damper including a gear wheel which is arranged to mesh with said tooth segment.

9. A selector lever for a motor vehicle transmission comprising:

a hollow selector lever rod;

a detent rod arranged in said hollow selector lever rod and displaceable between a starting position and a shifting position;

a shift handle disposed on the selector lever rod;

a push button connected to the shift handle and movable between a push button starting position and a push button shifting position;

a restoring spring biasing the push button toward said push button starting position;

a lever pivotably disposed on said shift handle, said lever having a first end and a second end, said lever being operatively connected with said push button proximate said first end and said lever being operatively connected with said detent rod proximate said second end such that a movement of the push button between said push button starting position and said push button shifting position correspondingly moves said detent rod between said starting position and said shifting position; and a damping element operatively connected with said lever, said damping element decelerating a pivotation of said lever.

10. A selector lever according to claim 9, wherein said lever comprises a first arm and a second arm, said first arm being operatively connected with said push button, and said second arm being operatively connected with said detent rod.

11. A selector lever according to claim 9, wherein said push button comprises a first end section which is swivellably connected to said shift handle and a second end section opposite the first end section which is hingedly connected with said lever.

12. A selector lever according to claim 10, wherein said push button comprises a first end section which is swivellably connected to said shift handle and a second end section opposite the first end section which is hingedly connected with said lever.

13. A selector lever according to claim 9, further comprising a tooth segment fixed on said lever, and wherein said damping element comprises a visco-damper which is fixed on the shift handle, said visco-damper including a gear wheel which is arranged to mesh with said tooth segment.

14. A selector lever according to claim 10, further comprising a tooth segment fixed on said lever, and wherein said damping element comprises a visco-damper which is fixed on the shift handle, said visco-damper including a gear wheel which is arranged to mesh with said tooth segment.

15. A selector lever according to claim 11, further comprising a tooth segment fixed on said lever, and wherein said damping element comprises a visco-damper which is fixed on the shift handle, said visco-damper including a gear wheel which is arranged to mesh with said tooth segment.

16. A selector lever according to claim 12, further comprising a tooth segment fixed on said lever, and wherein said damping element comprises a visco-damper which is fixed on the shift handle, said visco-damper including a gear wheel which is arranged to mesh with said tooth segment.

17. A selector lever for a motor vehicle transmission, comprising:
- a hollow selector lever rod;
- a detent rod arranged in said hollow selector lever rod and displaceable between a starting position and a shifting position;
- a shift handle disposed on the selector lever rod;
- a push button connected to the shift handle and movable between a push button starting position and a push button shifting position;
- an actuating mechanism configured such that a movement of the push button between said push button starting position and said push button shifting position correspondingly moves said detent rod between said starting position and said shifting position; and
- a visco-damper operatively connected with said actuating mechanism, said visco-damper comprising a housing containing a viscous liquid, said visco-damper decelerating movement of said detent rod from said shifting position toward said starting position.

18. A selector lever according to claim 17, wherein said actuating mechanism comprises a tooth segment, and wherein said visco-damper further comprises a gear wheel which is arranged to mesh with said tooth segment.

* * * * *